United States Patent Office 3,529,417
Patented Sept. 22, 1970

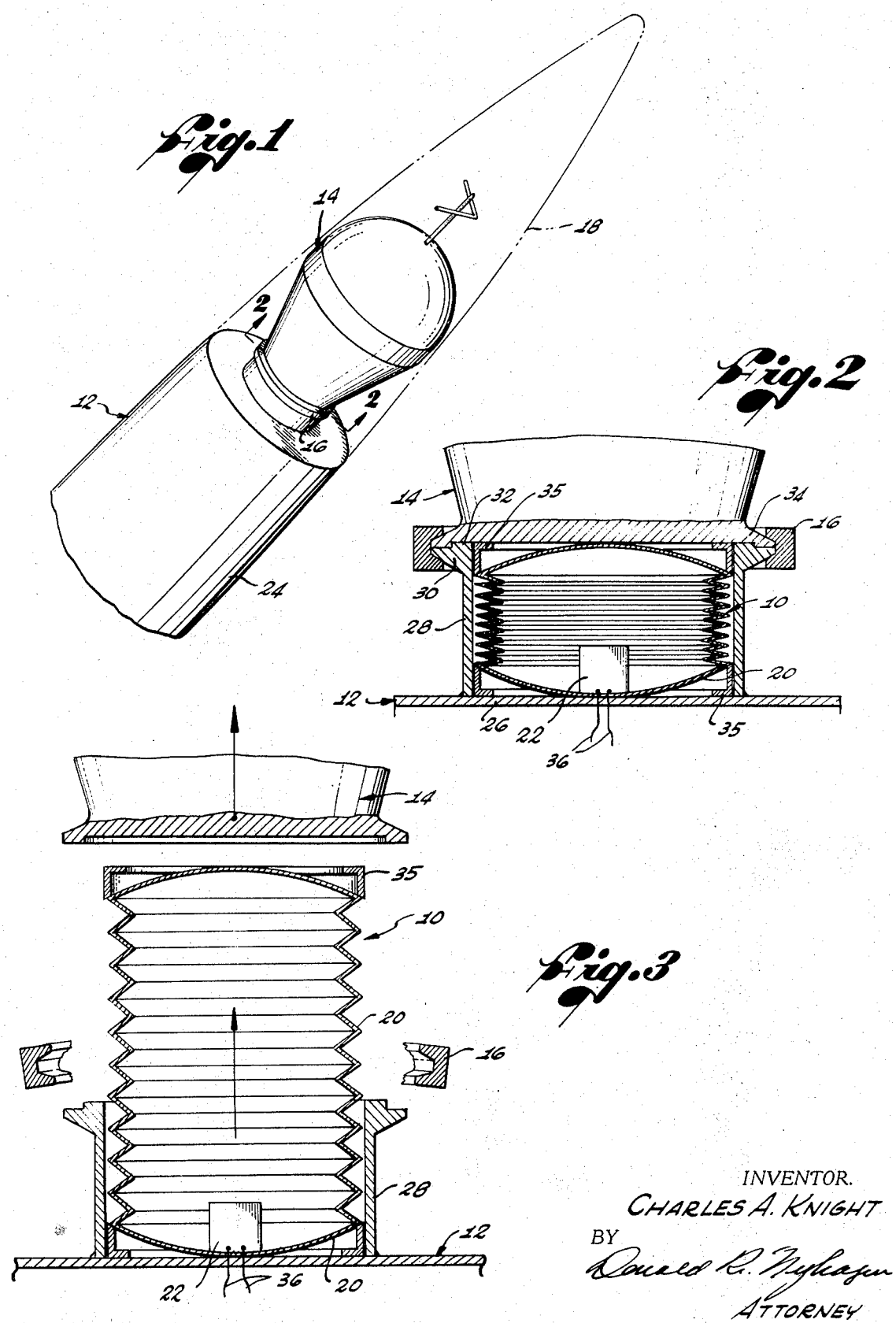

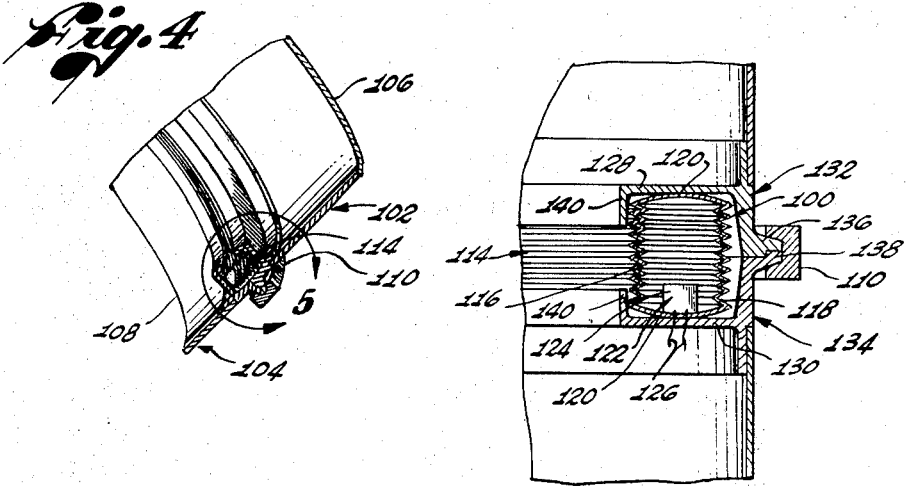
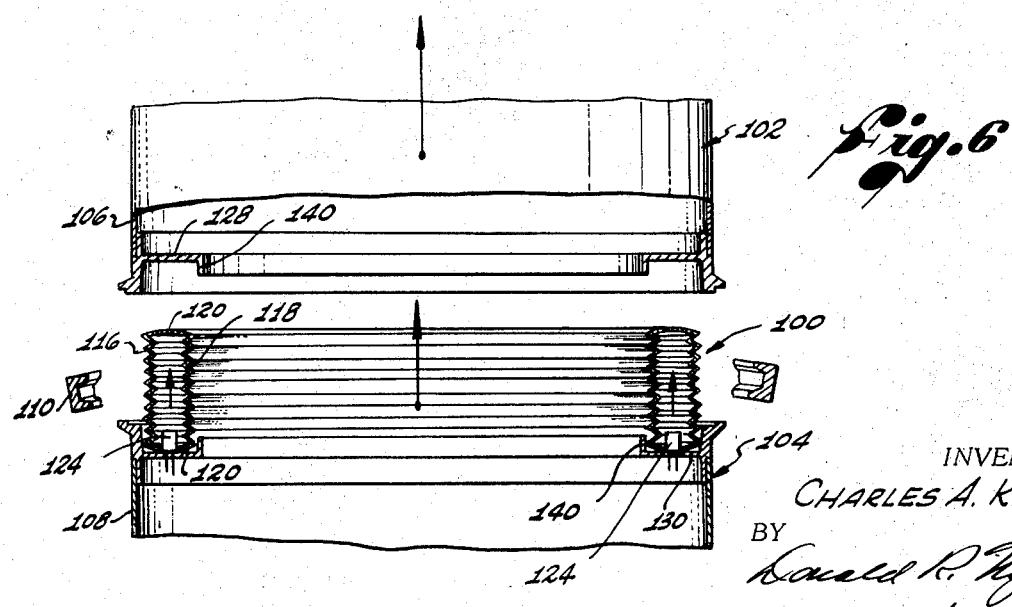

3,529,417
FLUID PRESSURE ACTUATED LINEAR FORCE GENERATING MEANS
Charles A. Knight, Los Angeles, Calif., assignor to TRW Inc., Redondo Beach, Calif., a corporation of Ohio
Filed Nov. 16, 1967, Ser. No. 683,635
Int. Cl. F01b 19/00, 29/08
U.S. Cl. 60—26.1                                    5 Claims

ABSTRACT OF THE DISCLOSURE

Fluid pressure actuated linear force generating means for separating relatively axially movable members, such as space vehicle components or stages in flight, the force generating means including an axially extendable pressure vessel or bellows disposed between members in the parting plane thereof, and means for selectively internally pressurizing the bellows to exert on the members opposing axial separation forces which are generally uniformly distributed over extended thrust surface areas on the members, whereby separation load concentrations in the members are avoided.

BACKGROUND OF THE INVENTION

Field of the invention

This invention relates generally to fluid pressure devices. More particularly, the invention relates to novel fluid pressure actuated linear force generating means for separating two relatively axially movable members, such as space vehicle components or stages in flight.

As will appear from the ensuing description, the linear force generating means of the invention may be utilized to advantage in various applications which require opposing linear separation forces on two members for moving the members axially with respect to one another. A primary application of the invention, however, involves separation of space vehicle components in flight, such as deploying a payload from a boost vehicle or separating two stages of a space vehicle. For this reason, the invention will be disclosed in connection with this particular application thereof.

Prior art

Fluid pressure actuated linear force generating means or separation devices of the general type to which this invention pertains are known in the art. Typical devices of this kind, for example, are disclosed in prior art Pats. Nos. 2,466,980; 2,575,071; 2,912,902; 2,937,899; and 3,093,346. With regard to separation of space vehicle components in flight, such as deployment of a payload from a boost vehicle or separation of space vehicle stages, the most common means for producing the required separation forces have been springs. During launch, the vehicle components are locked together in such a way that the springs are retained in a compressed condition. When the components are released for separation, the springs expand to forcibly thrust the vehicle components apart. The aforementioned Pat. No. 3,093,346 discloses a spring separation system of this kind. The existing spring separation systems, however, are quite heavy and limited in their range of applications and are thus not totally satisfactory.

The aforementioned Pat. Nos. 2,466,980; 2,575,071; 2,912,902; and 2,937,899 disclose fluid pressure actuated separation devices which avoid some of the disadvantages of the spring devices. These fluid pressure devices are characterized by an axially expandable or extendable pressure vessel, such as a bellows, which is disposed between the members to be separated, in the parting plane of these members, and means for internally pressurizing the vessel or bellows to expand the latter axially and thereby thrust the members away from one another. The internal pressurizing means employed in these devices typically comprise a propellant gas generator which is ignited to produce a high pressure propellant gas in the pressure vessel or bellows.

While these existing fluid pressure separation devices offer many advantages over the spring separation system, the arrangement and configuration of such devices are such as to preclude their use of many applications, notably the space vehicle applications referred to above. The existing fluid pressure separations devices, for example, are particularly unsuitable for separating members having annular main load bearing sections. Exemplary of such members are space vehicle stages, wherein the main load bearing sections are the relatively thin sheet metal walls or skins of the stages. It will be immediately evident to those versed in the art that the ideal separation system for this latter application is one in which the separation forces are exerted on the members or stages closely adjacent and generally uniformly about the entire circumference of the annular load bearing sections or walls of the members. Reference to the aforementioned prior art patents clearly will demonstrate that the separation devices disclosed therein are incapable of satisfying this particular requirement. The existing separation devices of this kind also occupy space which may be better utilized, particularly in certain applications, such as space vehicle applications.

SUMMARY OF THE INVENTION

This invention provides improved fluid pressure actuated linear force generating means or separation devices which avoid the above noted and other disadvantages of the existing devices of this character. Generally speaking, the force generating means of the present invention is characterized by its ability to exert opposing axial forces on the two members to be separated in such a way that the forces are generally uniformly distributed over extended thrust surface areas on the members, thus to avoid localized separation load concentrations in the members. One disclosed form of the invention, for example, is annular in shape and particularly suited for separating members, such as space vehicle stages, having annular main load bearing sections or walls. This particular form of the invention is arranged in such a way that the separation forces produced by the fluid pressure actuated linear force generating means are exerted on the members closely adjacent and generally uniformly about the entire circumference of the load bearing sections or walls. Accordingly, the separation forces or loads on the members during separation are transmitted directly to the annular load bearing sections in such a way as to produce generally uniform loading of these sections about the entire circumference thereof. The latter form of the invention also provides the advantage of a central void or space which may be utilized to contain other components, such as a payload in the case of a space vehicle.

BRIEF DESCRIPTION OF THE DRAWING

FIG. 1 is a fragmentary perspective view of a space vehicle embodying a fluid pressure actuated linear force generating means or separation device according to the invention for deploying a payload from the boost vehicle;

FIG. 2 is an enlarged section taken on line 2—2 in FIG. 1 and illustrating the present force generating means or separation device prior to deployment of the payload.

FIG. 3 is a view similar to FIG. 2 illustrating the force generating means or separation device after deployment;

FIG. 4 is a fragmentary perspective view, partly in section, of a modified fluid pressure actuated linear force generating means or separation device according to the invention for separating members, such as space vehicle stages, having annular main load bearing sections;

FIG. 5 is an enlargement of the area enclosed by the circular arrow 5 in FIG. 4 illustrating the present force generating means or separation device prior to separation; and FIG. 6 is a section similar to FIG. 5 illustrating the force generating means or separation device after separation.

DESCRIPTION OF THE PREFERRED EMBODIMENTS

In general terms, the invention provides a fluid pressure actuated linear force generating means represented in FIGS. 1 through 3 of the attached drawings by the force generating means 10, for exerting opposing axial separation forces on two members 12, and 14. In this instance, the member 12 is the boost vehicle of a spacecraft and the member 14 is a payload to be deployed from the boost vehicle in flight. During launch, the members, i.e., the boost vehicle and the payload, are secured against separation by coupling means 16. The payload may be encased within a shroud 18 which is jettisoned in flight, prior to deployment of the payload. As will appear presently, the shroud may be jettisoned by a modified fluid pressure actuated linear force generating means or separation device according to the invention. The linear force generating means 10 comprises a hermetic, axially expandable or extendable pressure vessel 20 which is disposed between the boost vehicle 12 and payload 14 in the parting plane thereof, and means 22 for internally pressurizing the vessel. When thus pressurized, the vessel expands or extends axially to thrust the payload away from the boost vehicle.

During launch, the boost vehicle 12 and payload 14 are secured against axial separation by the coupling means 16. When the payload is to be deployed, the shroud 18 is jettisoned and the coupling means 16 are released. Concurrently with or immediately after such release, the pressurizing means 22 are actuated to rapidly internally pressurize the expandable pressure vessel 20 of the linear force generating means or separation device 10. The pressure vessel is thereby extended axially to exert opposing axial separation forces on the boost vehicle and payload for thrusting the latter away from the vehicle.

Referring now in more detail to the drawing, the boost vehicle 12 is shown to have a generally cylindrical body 24 closed at its front end by an end wall 26. Coaxially secured to and extending forwardly from this wall is a cylindrical support 28 having an outwardly directed annular flange at its front end. The forwardly facing seating surface of this flange is stepped, as shown, to define an annular shoulder 32 on the flange. The payload 14 has been shown to have a generally bulbous shape. Surrounding the rear end of the payload body is an outwardly directed annular flange 34 which seats rearwardly against and is stepped to complement the boost vehicle flange 30 whereby the payload and boost vehicle are retained in coaxial alignment.

A variety of coupling means 16 may be employed to secure the payload 14 to the boost vehicle 12 until deployment of the payload. The particular coupling means illustrated is a pyrotechnic band clamp which surrounds and straddles hte abutting boost vehicle and payload flanges 30, 34. Means (not shown) are provided for igniting the band clamp and thereby releasing the payload for axial separation from the boost vehicle.

As already noted, actual separation or deployment of the payload 14 from the boost vehicle 12 is accomplished by the present fluid pressure actuated linear force generating means or separation device 10. In this instance, the pressure vessel 20 of the device comprises a corrugated, axially compressible and extendable bellows which is contained within the payload support 28. When the payload is secured to the boost vehicle, the bellows is axially compressed between thrust rings 35 which seat against the confronting walls of the boost vehicle and payload, as shown in FIG. 2. The illustrated pressurizing means 22 is a propellant gas generator housed within and having leads 36 extending externally of the bellows 20 for connection to an electrical power supply for igniting the propellant charge in the generator. It will be obvious to those versed in the arts, however, that other pressurizing means may be utilized, such as a gas generator or a pressurized gas source located externally of the bellows.

During launch, the payload 14 remains secured to the boost vehicle 12 by the pyrotechnic band clamp 16. Just prior to deployment, this clamp is ignited to release the payload for axial separation from the boost vehicle. Concurrently with or immediately after ignition of the clamp, the propellant gas generator 22 is ignited to generate a high pressure propellant gas within the bellows 20. The bellows is thereby rapidly expanded or extended in the axial direction to thrust the payload forwardly away from the boost vehicle.

The separation system described above may be generally categorized as a central force or thrust system. This system is employed in those applications in which the thrust surface areas on the members to be separated, against which the linear separation forces act, are located on the common axis of the members along which separation of the members occurs. The rate of expansion or extension of the bellows, and hence the magnitude of the separation forces exerted on the members during separation, may be regulated, as by selecting an appropriate propellant charge and/or restricting flow of the propellant gas from the propellant gas generator 22 to the interior of the bellows.

Reference is now made to FIGS. 4 through 6 which illustrate a modified fluid pressure actuated linear force generating means or separation device 100 according to the invention which may be broadly categorized as a circumferential force generating means or separation device. This modified device is particularly useful in those applications in which the main load bearing sections of the members to be separated are essentially annular or circular. In the drawings, for example, reference numerals 102 and 104 designate two members of this type which may be two stages of a space vehicle, such as the boost vehicle 12 and shroud 18 in FIG. 1. In this case, the load bearing sections of the members or stages comprise their cylindrical sheet metal walls or skins 106, 108. Prior to separation, members 102, 104 are releasably joined by coupling means 110. The illustrated coupling means comprise a pyrotechnic band clamp 112 like that described in connection with FIGS. 1 through 3.

The modified linear force generating means or separation device 100 illustrated in FIGS. 4 through 6 comprises an annular, axially expandable or extendable pressure vessel 114. This vessel has radially inner and outer sidewalls 116, 118 and annular end or pressure walls 120 which extend between and are sealed to the side walls. The illustrated pressure vessel 114, like the earlier pressure vessel 20 of the invention, is a bellows. The inner and outer side walls of this bellows are corrugated to permit the bellows to expand and contract axially. Associated with the bellows are means 122 for internally pressurizing and thereby axially extending the bellows. The illustrated pressurizing means comprise at least one, and preferably several, propellant gas generators 124. These generators are uniformly spaced about the interior of the bellows. The generators have leads 126 extending externally of the bellows to permit simultaneous ignition of the propellant charges in the generator.

According to the present invention, the force generating means or separation device 100 is coaxially arranged between the members 102, 104 to be separated in the parting plane of the members. The device is radially dimensioned so that the axial separation forces produced by the device are exerted on the members uniformly over annular thrust areas of members which are located closely adjacent the annular load bearing section or walls of the members. This minimizes or eliminates the need for additional load bearing elements and reinforcing means to transmit the separation loads to the main load bearing members or walls. In the drawings, for example, the annular pressure vessel or bellows 114 is externally radially dimensioned to fit closely within the members 102, 104 whereby the outer wall of the bellows is disposed in close proximity to the cylindrical load bearing walls 106, 108 of the members. Secured to the inner surfaces of and extending circumferentially about these load bearing walls are annular thrust shoulders 128, 130 against which seat the ends of the bellows. In the particular inventive embodiment illustrated, these thrust shoulders comprise portions of annular ring sections 132, 134 which are attached to the load bearing walls 106, 108 proper. Integrally formed on these ring sections are outwardly directed seating flanges 136, 138 which are releasably joined by the pyrotechnic band clamp 112. The thrust shoulders 128, 130 have inner retaining lips 140.

Prior to separation of the members or space vehicle stages 102, 104, the members are secured against separation by the clamp 112 and the bellows 114 is axially compressed between the thrust shoulders 128, 130, as shown in FIG. 6. Just prior to separation, the clamp is ignited to release the members for separation. Concurrently with or immediately after ignition of the clamp, the gas generator or generators 124 in the bellows 114 are ignited to generate a high pressure propellant gas in the bellows. The bellows is thereby axially extended to thrust the members 102, 104 apart, as shown in FIG. 6. The separation forces generated by the expanding bellows are transmitted through the thrust shoulders 128, 130 directly to the load bearing walls 106, 108 of the members. The form of the invention just described possesses the advantage of a central void or space within the annular bellows 114 which may be utilized to contain other components, such as a payload.

While the invention has been disclosed in what is presently conceived to be certain of its preferred and most practical embodiments, it will be understood by those versed in the art that various modifications of the invention are possible within the spirit and scope of the following claims.

The embodiments of the invention in which an exclusive property or privilege is claimed are defined as follows:

1. Fluid pressure actuated linear force generating means comprising:
   an annular axially expandable and compressible bellows including concentric corrugated radially inner and outer side walls defining an intervening annular chamber and annular relatively axially movable pressure walls at the ends of said bellows and parametrically sealed to the ends of said side walls so as to close the ends of said chamber; and
   means for internally pressuring said chamber to effect axial extension of said bellows.

2. Force generating means according to claim 1 wherein:
   said pressurizing means comprise at least one propellant gas generator within said chamber, and means accessible externally of said bellows for igniting the propellant charge in said generator.

3. Force generating means according to claim 2 including:
   a number of additional propellant gas generators within said chamber each having means accessible externally of said bellows for igniting the propellant charge in the respective generator; and
   said generators being generally uniformly circumferentially spaced about said chamber and being adapted to be ignited simultaneously to pressurize said bellows.

4. In combination:
   first and second cylindrical members disposed end to end so as to have a common central axis and adapted for relative movement along said axis;
   releasable coupling means joining said members about the circumference thereof; and
   fluid pressure actuated linear force generating means coaxially disposed between said members for exerting on said members opposing axial separation forces which are distributed over substantial thrust areas on said members centered on said axis, said force generating means comprising an annular axially expandable and compressible bellows including concentric corrugated radially inner and outer side walls defining an intervening annular chamber and annular relatively axially movable pressure walls at the ends of said bellows and parametrically sealed to the ends of said side walls, and means for internally pressurizing said chamber to effect axial extension of said bellows.

5. The combination according to claim 4 wherein:
   said pressurizing means comprises a number of propellant gas generators within said chamber each having means accessible externally of said bellows for igniting the propellant charge in the respective generator; and
   said generators being generally uniformly circumferentially spaced about said chamber and being adapted to be ignited simultaneously for pressurizing said bellows.

References Cited

UNITED STATES PATENTS

| 2,564,209 | 8/1951 | Murphy | 60—26.1 |
| 2,575,071 | 11/1951 | Rockwell | 60—26.1 |
| 2,912,902 | 11/1959 | Nessler | 60—26.1 XR |
| 3,031,845 | 5/1962 | Ludwig | 60—26.1 XR |
| 3,106,131 | 10/1963 | Barr et al. | 60—26.1 XR |
| 3,119,302 | 1/1964 | Barr | 60—26.1 XR |

WENDELL E. BURNS, Primary Examiner

U.S. Cl. X.R.

92—89